United States Patent
Gillis

(10) Patent No.: US 8,855,968 B1
(45) Date of Patent: Oct. 7, 2014

(54) ANALYTICAL EVALUATION TOOL FOR CONTINUOUS PROCESS PLANTS

(71) Applicant: Timothy Lynn Gillis, Woodbury, MN (US)

(72) Inventor: Timothy Lynn Gillis, Woodbury, MN (US)

(*) Notice: Subject to any disclaimer, the term of this patent is extended or adjusted under 35 U.S.C. 154(b) by 0 days.

(21) Appl. No.: 14/101,832

(22) Filed: Dec. 10, 2013

Related U.S. Application Data

(60) Provisional application No. 61/797,524, filed on Dec. 10, 2012.

(51) Int. Cl.
   *G06F 19/00* (2011.01)
   *G06F 11/34* (2006.01)
   *G06Q 10/06* (2012.01)

(52) U.S. Cl.
   CPC ........ *G06F 11/3409* (2013.01); *G06Q 10/0639* (2013.01)
   USPC ........... 702/182; 705/7.38; 705/7.39; 702/81; 702/84

(58) Field of Classification Search
   CPC . G06K 9/6217; G06K 9/6228; G06K 9/6284; G06N 3/08; G06Q 10/00; G06Q 10/0639; G05B 23/024; G06F 11/3409
   USPC ............. 702/81, 84, 127, 179–183, 187, 193, 702/45; 370/215; 548/491; 700/29, 79, 108, 700/103, 266; 703/2, 13; 705/7.38, 26.1, 705/7.39; 706/12, 20, 25
   See application file for complete search history.

(56) References Cited

U.S. PATENT DOCUMENTS

| | | | |
|---|---|---|---|
| 3,824,597 A * | 7/1974 | Berg | 370/215 |
| 6,735,541 B2 | 5/2004 | Kern et al. | |
| 7,062,417 B2 * | 6/2006 | Kruger et al. | 703/2 |
| 7,221,988 B2 | 5/2007 | Eryurek et al. | |
| 7,499,891 B2 * | 3/2009 | Hitt | 706/12 |
| 7,991,577 B2 | 8/2011 | Havener et al. | |
| 8,175,751 B2 | 5/2012 | Thakur et al. | |
| 8,224,690 B2 | 7/2012 | Jones et al. | |
| 2005/0050009 A1 | 3/2005 | Gardner et al. | |
| 2008/0201181 A1 | 8/2008 | Hileman et al. | |
| 2010/0099891 A1 * | 4/2010 | Okuno et al. | 548/491 |
| 2010/0132450 A1 | 6/2010 | Pomerantz et al. | |
| 2011/0168391 A1 | 7/2011 | Saleri et al. | |
| 2011/0264415 A1 | 10/2011 | Bleackley et al. | |
| 2011/0320388 A1 | 12/2011 | Wong et al. | |
| 2012/0290104 A1 * | 11/2012 | Holt et al. | 700/29 |
| 2013/0204420 A1 | 8/2013 | Treiber et al. | |
| 2013/0204546 A1 | 8/2013 | Devine et al. | |
| 2013/0226674 A1 * | 8/2013 | Field et al. | 705/7.38 |

* cited by examiner

*Primary Examiner* — John H Le
(74) *Attorney, Agent, or Firm* — Merchant & Gould P.C.

(57) ABSTRACT

A method for evaluating the operation of a continuous process plant uses operational data. The operational data includes data points representing the quantity of a substance processed by the continuous process plant during a plurality of time periods. The quantity of substance processed during these time periods is compared to a goal value. A reliability score is calculated. A banked opportunity score is calculated. An equivalent lost stream days score is calculated. The average quantity processed during periods that equaled or exceeded the goal is calculated. The average quantity processed during periods that were below the goal is calculated. The components of the equipment or machinery of the continuous process plant are classified and correlated to the quantity of lost opportunity. The scores are reported. The scores are also compared to historical data.

18 Claims, 13 Drawing Sheets

US 8,855,968 B1

ANALYTICAL EVALUATION TOOL FOR CONTINUOUS PROCESS PLANTS

CROSS REFERENCE TO RELATED APPLICATION

This application claims priority to U.S. Ser. No. 61/797,524, titled ANALYTICAL TOOL FOR IDENTIFYING POSSIBLE UNIT PRODUCTION RATES, filed on Dec. 10, 2012, the disclosure of which is hereby incorporated by reference in its entirety.

BACKGROUND

Continuous process plants continuously process input components to produce output components. An oil refinery is an example of a continuous process plant. An oil refinery (or petroleum refinery) is an industrial plant where crude oil is processed and refined into more useful products, such as gasoline and other fuels. Oil refineries are typically large, high-throughput plants. Oil refineries typically utilize an enormous amount of complex equipment and employ many workers to operate and maintain the equipment. The profits of an oil refinery are closely tied to the amount of oil that is refined. The amount of oil, typically measured in barrels, varies from day to day and depends on many different variables including how well the equipment performs on a given day, as well as how well the employees perform on that same day.

SUMMARY

In general terms, this disclosure is directed to an analytical evaluation tool for continuous process plants, including refineries, fertilizer plants, and petrochemical plants. In one possible configuration and by non-limiting example, the analytical evaluation tool computes a reliability score, an equivalent lost stream days score, a cut-rate barrels value, a banked opportunity score, and experience factor values. Various aspects are described in this disclosure, which include, but are not limited to, the following aspects.

One aspect is a method of evaluating the operation of a continuous process plant, comprising: loading operational data for a continuous process plant, wherein the operational data comprises a plurality of data points, each of the data points in the plurality of data points representing a time period and a quantity processed during that time period; identifying a goal value; processing the operational data to identify cut-rate data points, the cut-rate data points representing time periods with a quantity processed that is less than the goal value; calculating a cut-rate lost opportunity, wherein the cut-rate lost opportunity corresponds to the sum of the difference between the goal value and the quantity processed for each of the cut-rate data points; and calculating, by a computing device, a score for the continuous process plant, wherein the score corresponds to the quotient of the cut-rate lost opportunity divided by the goal value.

Another aspect is a continuous process plant comprising: processing machinery, the processing machinery being configured to process at least one substance; a computing device, the computing device comprising: a processing unit; and a set of computer-readable data storage media comprising at least one computer-readable data storage medium, the set of computer-readable data storage media storing software instructions that, when executed by the processing unit, cause the computing device to: load operational data for a continuous process plant, wherein the operational data comprises a plurality of data points, each of the data points in the plurality of data points representing a time period and a quantity processed during that time period; identify a goal value; process the operational data to identify cut-rate data points, the cut-rate data points representing time periods with a quantity processed that is less than the goal value; calculate a cut-rate lost opportunity, wherein the cut-rate lost opportunity corresponds to the sum of the difference between the goal value and the quantity processed for each of the cut-rate data points; and calculate a score for the continuous process plant, wherein the score corresponds to the quotient of the cut-rate lost opportunity divided by the goal value.

Yet another aspect is a method of evaluating the operation of a continuous process plant, comprising: loading operational data for a continuous process plant, wherein the operational data comprises a plurality of data points, each of the data points in the plurality of data points representing a time period and a quantity processed during that time period; identifying a goal value; processing the operational data to identify cut-rate data points, the cut-rate data points representing time periods with a quantity processed that is less than the goal value; calculating a cut-rate lost opportunity, wherein the cut-rate lost opportunity corresponds to the sum of the difference between the goal value and the quantity processed for each of the cut-rate data points; calculating, by a computing device, a score for the continuous process plant, wherein the score corresponds to the quotient of the cut-rate lost opportunity divided by the goal value; processing the operational data to identify banked-opportunity data points, the banked-opportunity data points representing time periods with a quantity processed that is greater than the goal value; calculating a banked opportunity, wherein the banked opportunity corresponds to the sum of the difference between the quantity processed and the goal value for each of the banked opportunity data points; determining a reliability score, wherein the reliability score corresponds to the percent of the data points in the plurality of data points having a quantity processed that is equal to or greater than the goal value; determining a first count value, wherein the first count value corresponds to a number of data points in the plurality of data points having a quantity processed that is equal to or greater than the goal value; determining a second count value, wherein the second count value corresponds to a number of data points in the plurality of data points having a quantity processed that is less than the goal value; loading historical operational data for a continuous process plant, wherein the historical operational data comprises a plurality of historical data points; and comparing the operational data to the historical operational data.

DETAILED DESCRIPTION

Figure 1:
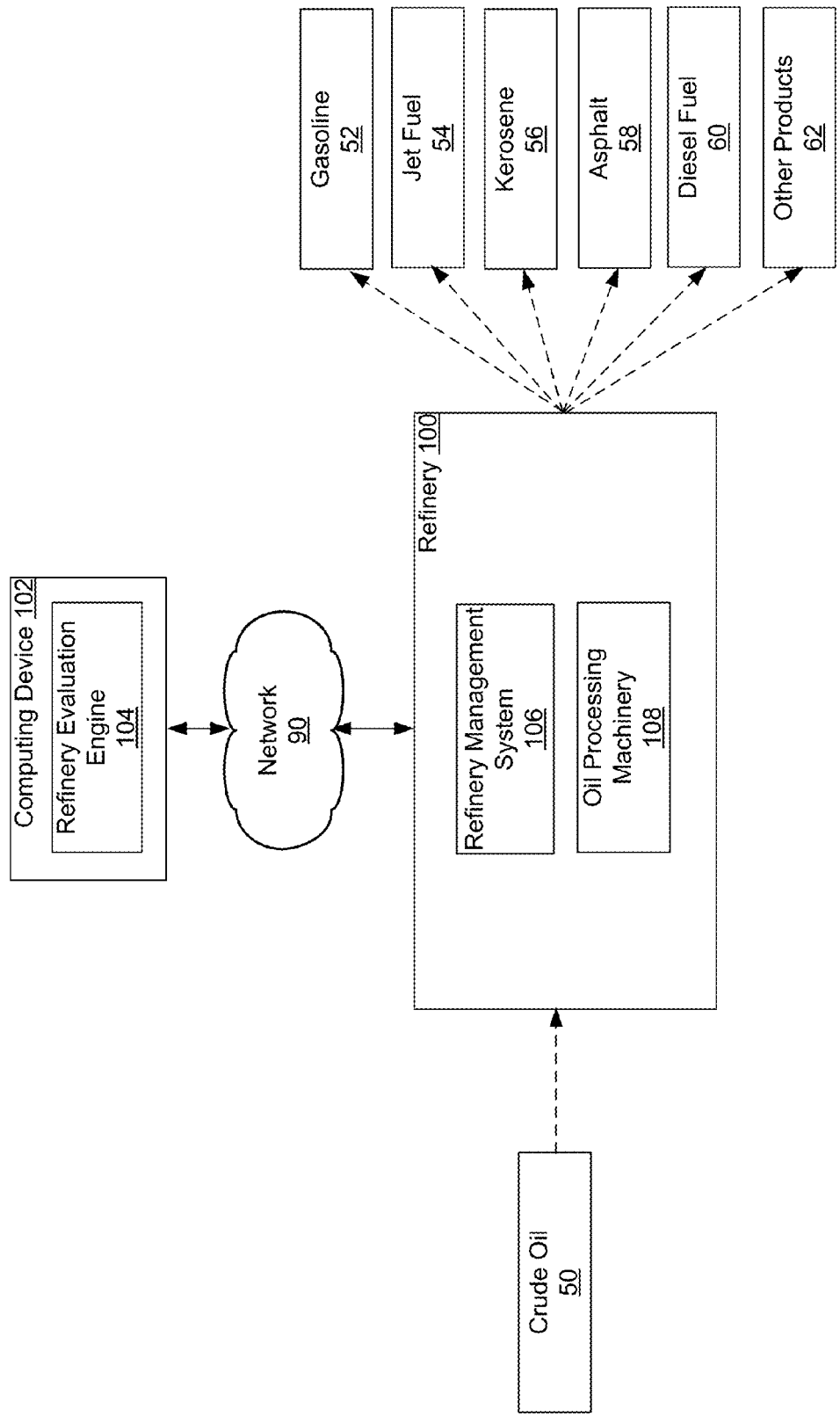
FIG. 1 is a block diagram illustrating an example refinery and refinery evaluation engine.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Sometimes outside consultants are hired by oil refinery management to evaluate the performance of an oil refinery. It would be helpful for such consultants to have tools at their disposal to help them better evaluate the performance of the refinery, so that they could in turn better advise the management on how well the oil refinery is operating, and make recommendations on whether or not specific changes would be helpful and measure the results of implementing the recommendations.

FIG. 1 is a block diagram illustrating an example refinery 100 and refinery evaluation engine 104. The refinery 100 includes a refinery management system 106 and oil processing machinery 108. The refinery evaluation engine 104 is a component of a computing device 102, which communicates with the refinery 100 through network 90.

The refinery 100 is a facility for processing and converting crude oil or crude oil byproducts into useful products. As shown in FIG. 1, the refinery receives crude oil 50 as an input and processes it to produce gasoline 52, jet fuel 54, kerosene 56, asphalt 58, diesel fuel 60, and other products 62. In some embodiments, the refinery 100 receives other or additional input substances. Further, in some embodiments, the refinery 100 produces other output products, such as feedstocks for petrochemical plants, asphalt, and coke. Although the embodiments in this application include a refinery, the disclosed systems and methods are applicable to any continuous process plant, including fertilizer plants and petrochemical plants.

The refinery 100 includes a refinery management system 106 and oil processing machinery 108. The refinery management system 106 is a system that, among other things, records information about the operations of the refinery 100, including the quantity of crude oil processed during a specific time period. The oil processing machinery 108 is machinery that processes oil. The refinery 100, refinery management system 106, and the oil processing machinery 108 are illustrated and discussed in greater detail with respect to FIG. 2.

The computing device 102 includes a refinery evaluation engine 104. In some embodiments, the computing device 102 is connected to the refinery 100 via a network 90. The network 90 is a system of devices interconnected by wired or wireless links. In various embodiments, the network 90 is implemented in various ways. For example, in some embodiments, the network 90 is implemented as one or more wide area networks, such as the Internet. In other embodiments, the network 90 is implemented as one or more local area networks or networks on other scales. Additionally, although the computing device 102 is shown as being outside of the refinery 100 in FIG. 1, in some embodiments the computing device 102 is a component of the refinery 100. In other embodiments, the computing device 102 does not utilize network 90 to receive information about the refinery. For example, the information about the refinery may be delivered orally or as a printed or handwritten report or on a thumb drive, compact disc, or other computer readable medium. The computing device 102 is illustrated and described in greater detail with respect to FIG. 3.

The refinery evaluation engine 104 evaluates operational data associated with the refinery 100. In some embodiments, the refinery evaluation engine 104 evaluates the information recorded by the refinery management system 106. However, in other embodiments, the refinery evaluation engine 104 evaluates other information. In some embodiments, the refinery evaluation engine 104 is a separate component from the refinery management system 106. In other embodiments, the refinery evaluation engine 104 is a component of the refinery management system 106. The refinery evaluation engine 104 is illustrated and described in greater detail with respect to FIGS. 4-11.

Figure 2:
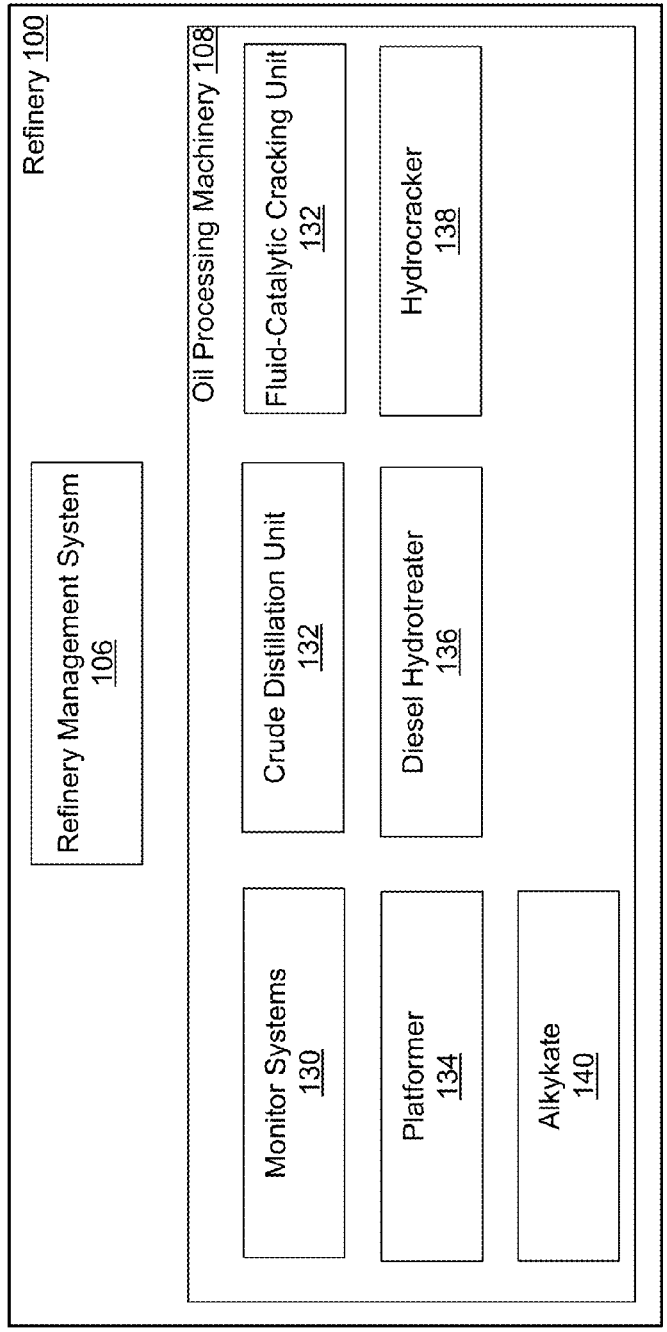
FIG. 2 is a block diagram illustrating an example of the refinery of FIG. 1.

FIG. 2 is a block diagram illustrating an example refinery 100, including the refinery management system 106 and the oil processing machinery 108. In the example shown, the oil processing machinery 108 includes monitor systems 130, a crude distillation unit 132, a fluid-catalytic cracking unit 134, a platformer 136, a diesel hydrotreater 138, a hydrocracker 140, and an alkykate 142.

The refinery management system 106 is a system that, among other things, records information about the operations of the refinery 100, including the quantity of crude oil processed during a specific time period. Additionally, in some embodiments, the refinery management system 106 records information about the operational status of the oil processing machinery 108. For example, in some examples, the refinery management system 106 records the number of barrels of crude oil processed in a day and a list of the equipment that was not operational or was not operating at full capacity during the day. In some embodiments, the refinery management system 106 communicates with one or more monitor systems 130 to collect operational data about the refinery 100. However, in other embodiments, the information in the refinery management system 106 is collected and recorded by one or more operators.

In some embodiments, the refinery management system 106 includes one or more computing devices. In other embodiments, the refinery management system 106 includes log books and paper records. Other embodiments of refinery management system 106 are possible as well.

The oil processing machinery 108 includes many types of machinery that processes oil or monitors or controls the machinery that processes oil. Typically, different types of oil processing machinery 108 are used to produce different final products at the refinery 100. The oil processing machinery 108 illustrated is merely exemplary and some embodiments of refinery 100 include different or additional machinery. Further, some embodiments of refinery 100 include more than one of each of the listed types of machinery.

Figure 3:
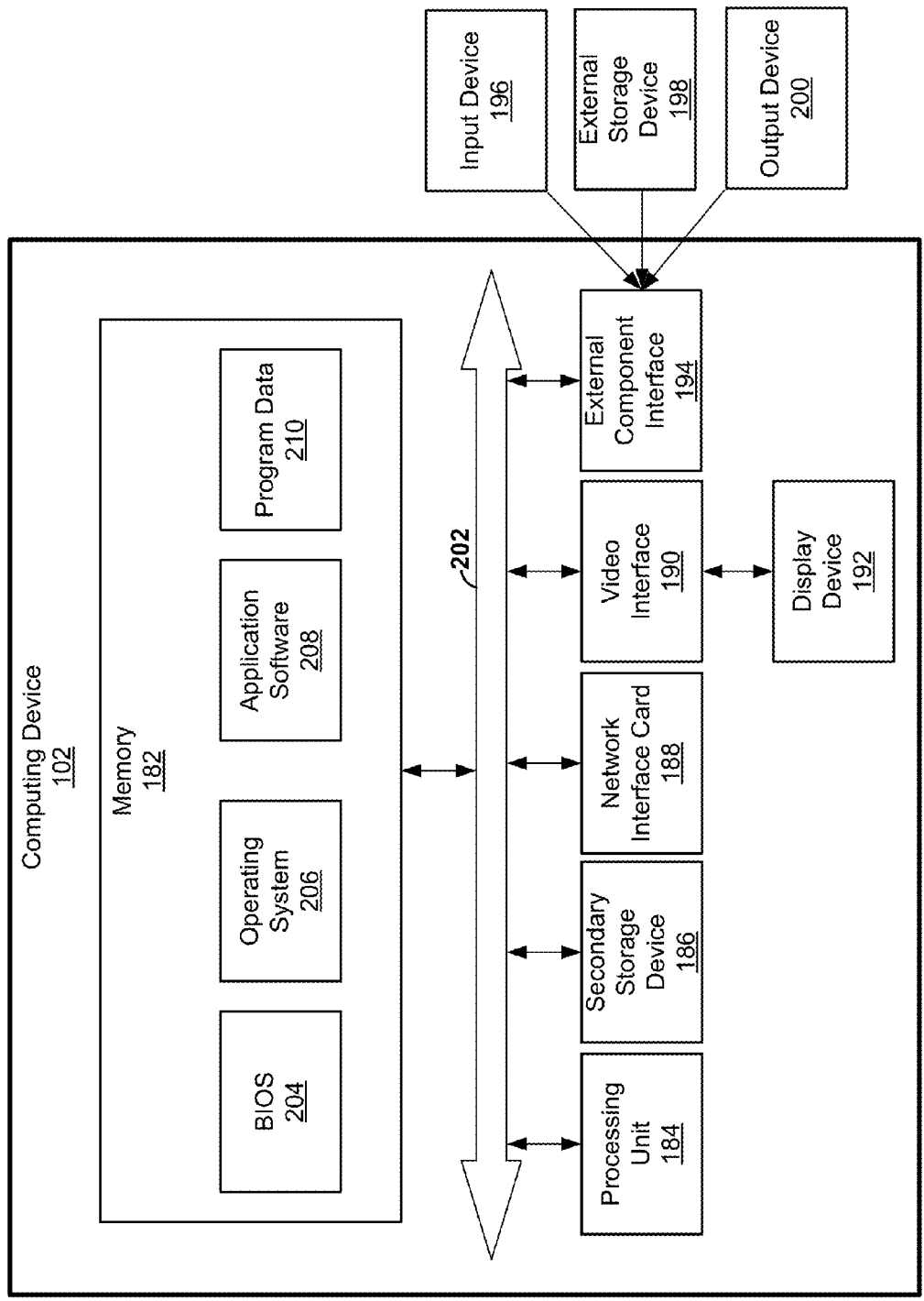
FIG. 3 is a block diagram illustrating example physical components of a computing device configured to run the refinery evaluation engine of FIG. 1.

FIG. 3 is a block diagram illustrating example physical components of a computing device 102. In some embodiments, the computing device 102 is implemented using multiple computing devices. It should be appreciated that in other embodiments, the computing device 102 is implemented using physical components other than those illustrated in the example of FIG. 3.

In the example of FIG. 3, the computing device 102 comprises a memory 182, a processing unit 184, a secondary storage device 186, a network interface card 188, a video interface 190, a display device 192, an external component interface 194, an input device 196, an external storage device 198, an output device 200, and a communications medium 202. In other embodiments, computing devices are implemented using more or fewer hardware components. For instance, in another example embodiment, a computing device does not include a video interface, a display device, an external storage device, or an input device.

The memory 182 includes one or more computer-readable data storage media capable of storing data or instructions or both. In different embodiments, the memory 182 is implemented in different ways. For instance, in various embodiments, the memory 182 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data. In some embodiments, the memory 182 includes non-transitory media.

The processing unit 184 includes one or more physical integrated circuits that selectively execute software instructions. In various embodiments, the processing unit 184 is implemented in various ways. For instance, in one example embodiment, the processing unit 184 is implemented as one or more processing cores. For instance, in this example embodiment, the processing unit 184 may be implemented as one or more Intel Core 2 microprocessors. In another example embodiment, the processing unit 184 is implemented as one or more separate microprocessors. In yet another example embodiment, the processing unit 184 is implemented as an ASIC that provides specific functionality. In yet another example embodiment, the processing unit 184 provides specific functionality by using an ASIC and by executing software instructions.

In different embodiments, the processing unit 184 executes software instructions in different instruction sets. For instance, in various embodiments, the processing unit 184 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 186 includes one or more computer-readable data storage media. The secondary storage device 186 stores data and software instructions not directly accessible by the processing unit 184. In other words, the processing unit 184 performs an I/O operation to retrieve data and/or software instructions from the secondary storage device 186. In various embodiments, the secondary storage device 186 is implemented by various types of computer-readable data storage media. For instance, the secondary storage device 186 may be implemented by one or more magnetic disks, magnetic tape drives, CD-ROM discs, DVD-ROM discs, Blu-Ray discs, solid state memory devices, Bernoulli cartridges, and/or other types of computer-readable data storage media. In some embodiments, the secondary storage device 186 includes non-transitory media.

The network interface card 188 enables the computing device 102 to send data to and receive data from a computer communication network. In different embodiments, the network interface card 188 is implemented in different ways. For example, in various embodiments, the network interface card 188 is implemented as an Ethernet interface, a token-ring network interface, a fiber optic network interface, a wireless network interface (e.g., WiFi, WiMax, etc.), or another type of network interface.

The video interface 190 enables the computing device 102 to output video information to the display device 192. In different embodiments, the video interface 190 is implemented in different ways. For instance, in one example embodiment, the video interface 190 is integrated into a motherboard of the computing device 102. In another example embodiment, the video interface 190 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 192 is implemented as various types of display devices. Example types of display devices include, but are not limited to, cathode-ray tube displays, LCD display panels, plasma screen display panels, touch-sensitive display panels, LED screens, projectors, and other types of display devices. In some embodiments, the display device 192 is integral with the computing device 102. However, in other embodiments, the display device 192 is a separate component from the computing device 102. In various embodiments, the video interface 190 communicates with the display device 192 in various ways. For instance, in various embodiments, the video interface 190 communicates with the display device 192 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 194 enables the computing device 102 to communicate with external devices. In various embodiments, the external component interface 194 is implemented in different ways. For instance, in one example embodiment, the external component interface 194 is a USB interface. In other example embodiments, the external component interface 194 is a FireWire interface, a serial port interface, a parallel port interface, a PS/2 interface, and/or another type of interface that enables the computing device 102 to communicate with external components.

In different embodiments, the external component interface 194 enables the computing device 102 to communicate with different external components. For instance, in the example of FIG. 3, the external component interface 194 enables the computing device 102 to communicate with the input device 196, and the external storage device 198. In other embodiments, the external component interface 194 enables the computing device 102 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 102.

The input device 196 is a component that provides user input to the computing device 102. Different implementations of the computing device 102 interface with different types of input devices. Example types of input devices include, but are not limited to, keyboards, mice, trackballs, stylus input devices, key pads, microphones, joysticks, touch-sensitive display screens, and other types of devices that provide user input to the computing device 102. In some embodiments, the input device 196 is external to the computing device 102, while in other embodiments the input device 196 is integral to the computing device 102. In some embodiments, the input device 196 communicates with the computing device 102 through the external component interface 194, while in other embodiments, the input device 196 communicates with the computing device 102 through in other interfaces, such as through an interface integrated into a motherboard of the computing device 102.

The external storage device 198 is an external component comprising one or more computer readable data storage media. Different implementations of the computing device 102 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. In some embodiments, the external storage device 198 includes non-transitory media.

The output device 200 is a component that the computing device 102 uses to provide output. Different implementations of the computing device 102 interface with different types of output devices. A printer is an example of an output device 200.

The communications medium 202 facilitates communication among the hardware components of the computing device 102. In different embodiments, the communications medium 202 facilitates communication among different components of the computing device 102. For instance, in the example of FIG. 3, the communications medium 202 facilitates communication among the memory 182, the processing unit 184, the secondary storage device 186, the network interface card 188, the video interface 190, and the external component interface 194. In different implementations of the computing device 102, the communications medium 202 is implemented in different ways. For instance, in different implementations of the computing device 102, the communications medium 202 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 182 stores various types of data or software instructions or both. For instance, in the example of FIG. 3, the memory 182 stores a Basic Input/Output System (BIOS) 204, an operating system 206, application software 208, and program data 210. The BIOS 204 includes a set of software instructions that, when executed by the processing unit 184, cause the computing device 102 to boot up. The operating system 206 includes a set of software instructions that, when executed by the processing unit 184, cause the computing device 102 to provide an operating system that coordinates the activities and resources of the computing device 102. Example types of operating systems include, but are not limited to, Microsoft Windows, Linux, Unix, Apple OS X, Apple iOS, Palm webOS, Palm OS, Google Chrome OS, Google Android OS, and so on. The application software 208 includes a set of software instructions that, when executed by the processing unit 184, cause the computing device 102 to provide applications to a user of the computing device 102. The program data 210 is data that the application software 208 generates or uses or both.

Figure 4:
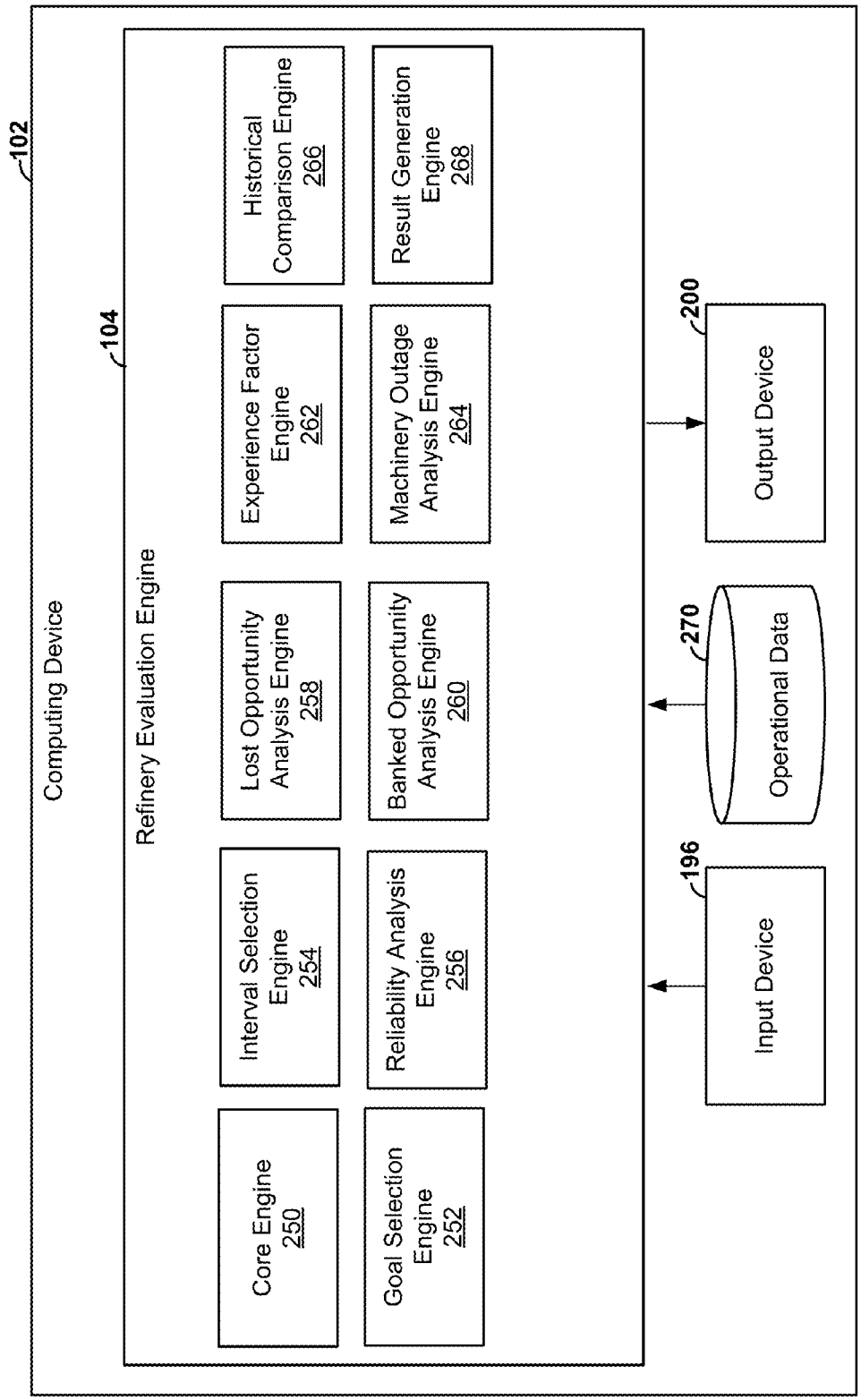
FIG. 4 is a schematic block diagram of the refinery evaluation engine of FIG. 1.

FIG. 4 is a schematic block diagram of the refinery evaluation engine 104. The refinery evaluation engine 104 includes a core engine 250, a goal selection engine 252, an interval selection engine 254, a reliability analysis engine 256, a lost opportunity analysis engine 258, a banked opportunity analysis engine 260, an experience factor engine 262, an equipment outage analysis engine 264, a historical comparison engine 266, and a result generation engine 268. Also shown is operational data 270.

The core engine 250 operates to coordinate the other engines and, in some embodiments, communicate with the operating system 206, the input device 196, and the output device 200.

The goal selection engine 252 operates to determine a goal value for the refinery evaluation engine 104. An example process performed by some embodiments of the goal selection engine 252 is illustrated and described in more detail with respect to FIG. 5.

The interval selection engine 254 operates to determine an interval value for the refinery evaluation engine 104. An example process performed by some embodiments of the interval selection engine 254 is illustrated and described in more detail with respect to FIG. 6.

The reliability analysis engine 256 operates to calculate a reliability score for the refinery 100. An example process performed by some embodiments of the reliability analysis engine 256 is illustrated and described in more detail with respect to FIG. 7.

The lost opportunity analysis engine 258 operates to calculate various scores, including an equivalent lost stream days score, relating to days during which the refinery 100 did not meet the goal. An example process performed by some embodiments of the lost opportunity analysis engine 258 is illustrated and described in more detail with respect to FIG. 8.

The banked opportunity analysis engine 260 operates to calculate a banked opportunity score for the refinery 100. An example process performed by some embodiments of the banked opportunity analysis engine 260 is illustrated and described in more detail with respect to FIG. 9.

The experience factor engine 262 operates to calculate experience factors for the refinery 100. An example process performed by some embodiments of the experience factor engine 262 is illustrated and described in more detail with respect to FIG. 10.

The equipment outage analysis engine 264 operates to compute a machinery outage score for various components of the oil processing machinery 108. An example process performed by some embodiments of the equipment outage analysis engine 264 is illustrated and described in more detail with respect to FIG. 11.

The historical comparison engine 266 operates to compare operational data to historical data for the refinery 100. An example historical comparison report created by an embodiment of the historical comparison engine 266 is illustrated and described in more detail with respect to FIG. 13.

The result generation engine 268 operates to transmit information out of the refinery evaluation engine 104 so that it may be considered by a user of the refinery evaluation engine 104. In some embodiments, the result generation engine 268 generates a report including information generated by at least one of the other modules in the refinery evaluation engine 104. In some embodiments, the report includes data, graphs, charts, or other means of communicating information. In some embodiments, the result generation engine 268 transmits a report to the output device 200. In other embodiments, the result generation engine 268 transmits a report across the network 90. In yet other embodiments, the result generation engine 268 operates to display a report on the display device 192. In other embodiments, the result generation engine 268 operates to display information generated by at least one of the other modules on a user interface.

The operational data 270 contains information about the operations of the refinery 100. In some embodiments, the operational data 270 comprises a database. In other embodiments, the operational data 270 comprises one or more files. In some embodiments, the operational data 270 is a component of the refinery evaluation engine 104. While in other embodiments, the operational data 270 is separate from but accessible by the refinery evaluation engine 104.

Figure 5:
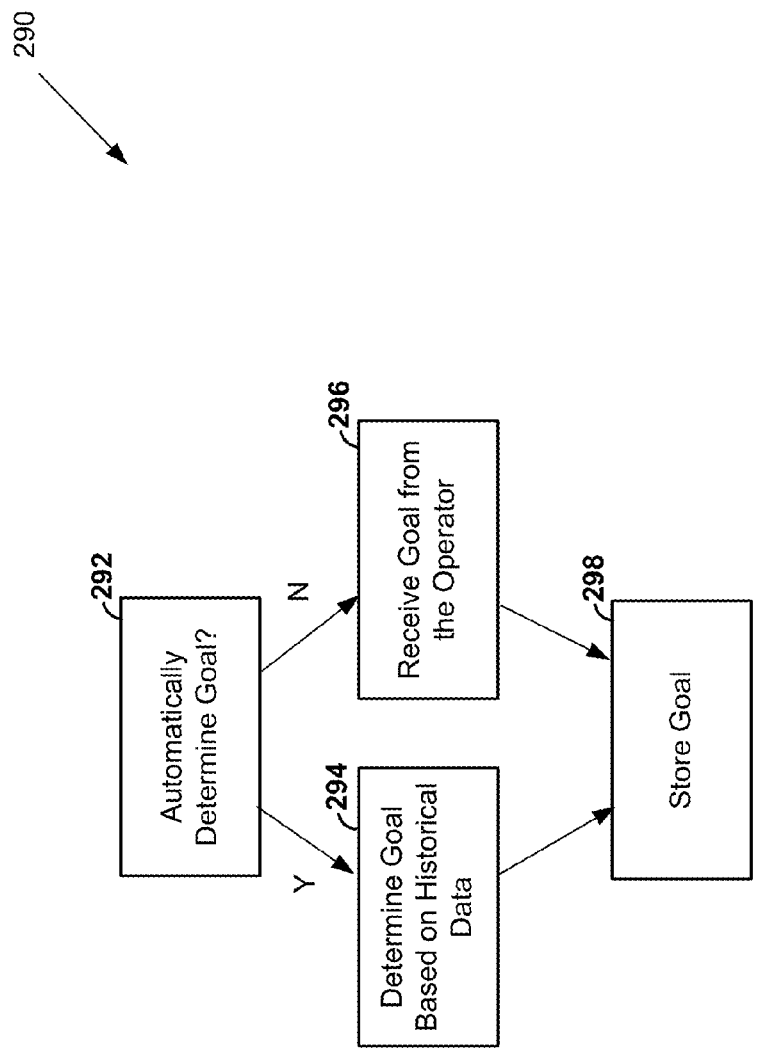
FIG. 5 illustrates an example process performed by some embodiments of the goal selection engine of the refinery evaluation engine of FIG. 1.

FIG. 5 illustrates an example process 290 performed by some embodiments of the goal selection engine 252. The process 290 operates to determine a goal value for the refinery evaluation engine 104. In some embodiments, the goal value is a daily production goal for the refinery 100. For example, the goal value may be to process a certain number of barrels of oil processed in a day. In other embodiments, the goal value may apply to a different time period, such as a shift.

Initially, at step 292, the goal selection engine 252 determines whether to automatically select a goal value. In some embodiments, an operator of the refinery evaluation engine 104 is prompted to select a value indicative of whether the goal should be automatically selected. In other embodiments, the goal selection engine 252 consults a settings file to determine whether the goal should be automatically selected. In yet other embodiments, the goal selection engine 252 is configured to always automatically select the goal. Conversely, in other embodiments, the goal selection engine 252 is configured to always require the operator to enter the goal.

Next, step 294 is performed if step 292 determined that the goal should be automatically determined. In some embodiments, the goal selection engine 252 evaluates historical operational data to determine an appropriate goal. For example, in some embodiments, the goal is set to the median daily output value over the previous year. In other embodiments, the goal value is set to the average daily output value over the previous year. In yet other embodiments, the goal value is set to the maximum daily output value achieved on at least 10-25% of the production days over the past year. Further, in some embodiments, the operator specifies a percentage value and then the goal is set to the maximum output value achieved on at least that percentage of days during the historical time period. In yet other embodiments, the goal value is automatically determined using other methods.

Alternatively, step 296 is performed next if step 292 determines that the goal should not be automatically determined. In step 296, the goal is received from the operator. In some embodiments, the operator may be prompted for the goal value. In yet other embodiments, the goal value may be read from a settings file or the operational data. In some embodiments, the goal is determined by an operator based on economic requirements for the refinery 100 to operate profitably.

Next, at step 298, the goal value is stored. The goal value may be stored as part of the operational data 270. In other embodiments, the goal value is stored in memory at a location accessible to some or all of the other engines of the refinery evaluation engine 104.

Figure 6:
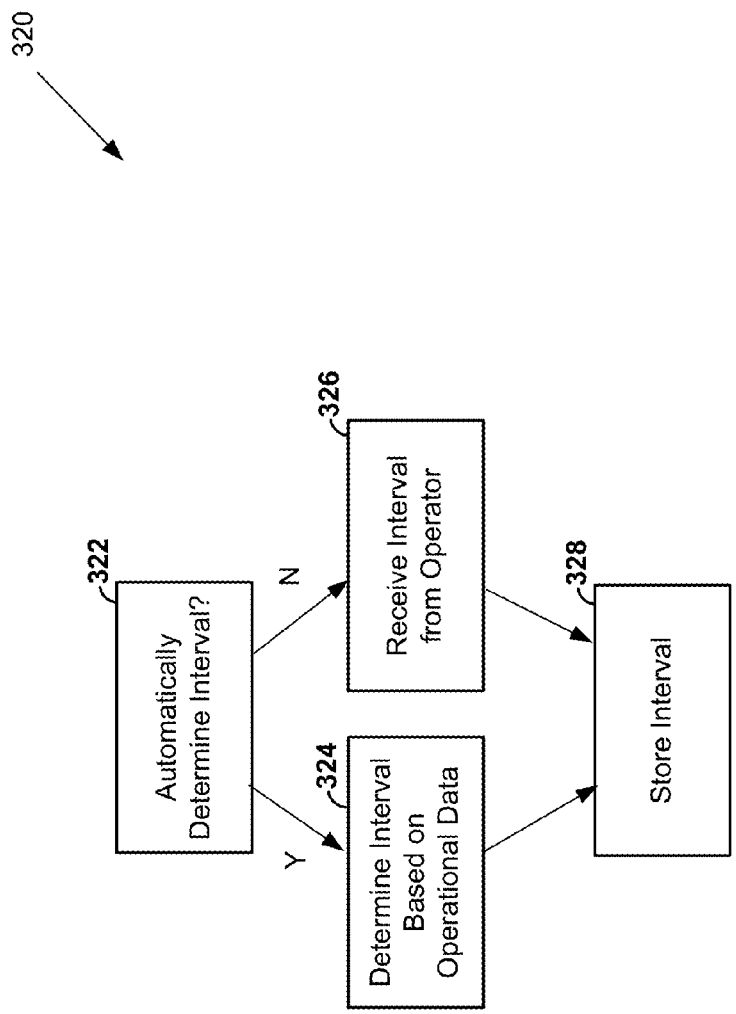
FIG. 6 illustrates an example process performed by some embodiments of the interval selection engine of the refinery evaluation engine of FIG. 1.

FIG. 6 illustrates an example process 320 performed by some embodiments of the interval selection engine 254. The process 320 operates to determine an interval value for the refinery evaluation engine 104. In some embodiments, the interval value is a specific duration of time over which the refinery evaluation engine 104 evaluates the performance of the refinery 100. For example, the interval value is a week, a month, a quarter, or a year.

Initially, at step 322, the interval selection engine 254 determines whether to automatically select an interval value. In some embodiments, an operator of the refinery evaluation engine 104 is prompted to select a value indicative of whether the interval should be automatically selected. In other embodiments, the interval selection engine 254 consults a settings file to determine whether the interval should be automatically selected. In yet other embodiments, the interval selection engine 254 is configured to always automatically select the interval. Conversely, in other embodiments, the interval selection engine 254 is configured to always require the operator to enter the interval.

Next, step 324 is performed if step 322 determined that the interval should be automatically determined. In some embodiments, the interval selection engine 254 evaluates the operational data to determine an appropriate interval. For example, in some embodiments, the interval value is set to one quarter if the operational data consists of operational data for approximately one quarter. In yet other embodiments, the interval value is automatically determined using other methods.

Alternatively, step 326 is performed next if step 322 determines that the interval should not be automatically determined. In step 326, the interval is received from the operator. In some embodiments, the operator may be prompted for the interval value. In some of these embodiments, the operator specifies the interval by selecting it from a drop down list or entering a start and end date for the interval. In other embodiments, the interval value may be read from a settings file or the operational data. In other embodiments, other methods of receiving user input.

Next, at step 328, the interval value is stored. The interval value may be stored as part of the operational data 270. In other embodiments, the interval value is stored in memory at a location accessible to some or all of the other engines of the refinery evaluation engine 104.

Figure 7:
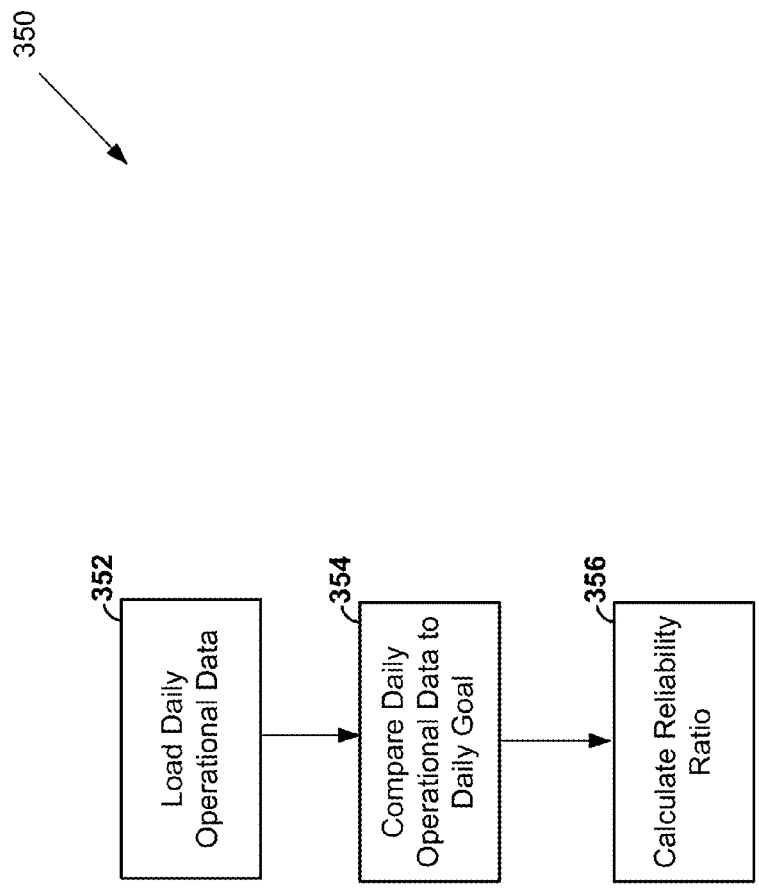
FIG. 7 illustrates an example process performed by some embodiments of the reliability analysis engine of the refinery evaluation engine of FIG. 1.

FIG. 7 illustrates an example process 350 performed by some embodiments of the reliability analysis engine 256. The process 350 operates to calculate a reliability score for the refinery 100. In some embodiments, the reliability score is equal to the percentage of days equal to or exceeding the goal value during the interval. The reliability score can be used to determine when to invest capital in an engineering project. For example, a low reliability score suggests that an engineering project may not be necessary to improve refinery output. While, on the other hand, a high reliability score suggests that the refinery may be operating close to capacity and an engineering project may be required to further increase output.

Initially at step 352, the operational data is loaded. In some embodiments, the daily output value for each day during the interval is loaded into memory. In addition, the goal value is also loaded into memory.

Next at step 354, the output value for each day in the interval is compared to the goal value. For each day in the interval that equals or exceeds the goal value, a counter is incremented. In this manner, the number of days during the interval that equal or exceed the goal value are counted. In other embodiments, the number of days during the interval that equaled or exceeded the goal are counted using other methods.

Next at step 356, the reliability score is calculated as the ratio of the number of days equaling or exceeding the goal to the total number of days in the interval. In some embodiments, the ratio is stored in memory. In other embodiments, the ratio is stored in the operational data.

Figure 8:
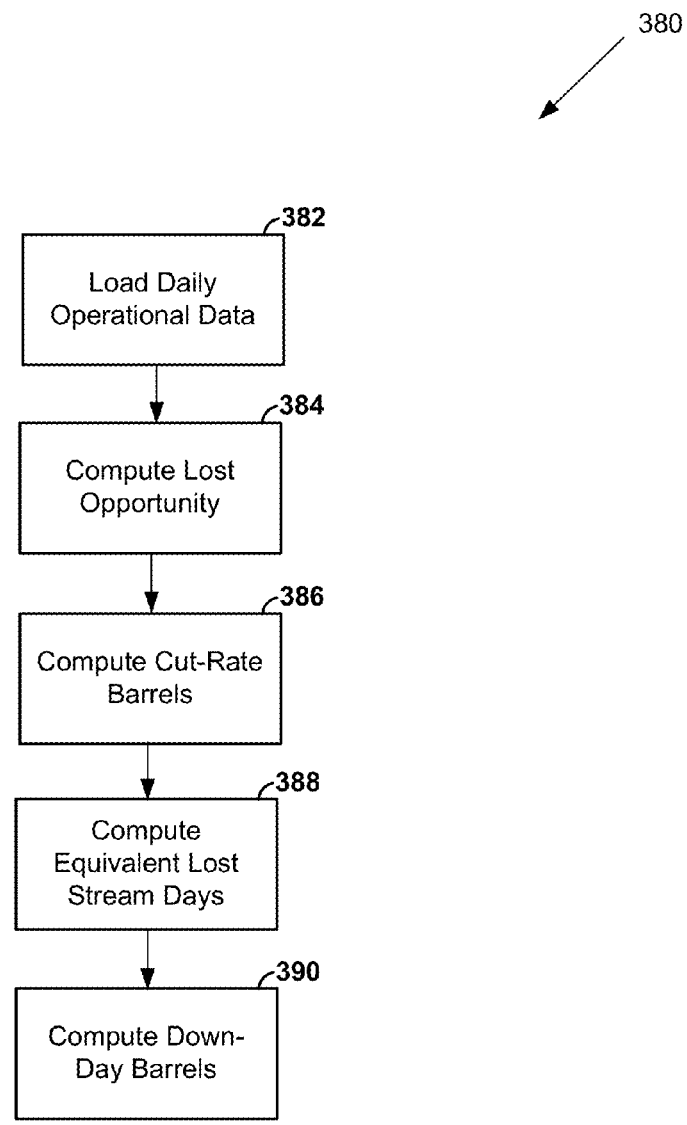
FIG. 8 illustrates an example process performed by some embodiments of the lost stream days analysis engine of the refinery evaluation engine of FIG. 1.

FIG. 8 illustrates an example process 380 performed by some embodiments of the lost opportunity analysis engine 258. The process 380 operates to calculate a lost opportunity value for a refinery 100 over an interval. The lost opportunity corresponds to the difference between goal and actual output on the days the refinery failed to meet goal. There are two components to the lost opportunity: cut-rate barrels and down-day barrels. Cur-rate barrels correspond to the difference between the goal and actual output on the days the refinery 100 was operational but did not meet the goal. Down day barrels correspond to the difference between goal and actual output on the days the refinery 100 was not operational. In some embodiments, an equivalent lost stream days score (by dividing cut-rate barrels by the daily goal) is calculated as well.

The information produced by this process can be used to determine and prioritize improvement efforts at a refinery 100. Additionally, the information provided by this process can suggest which types of tools are likely to have the largest overall impact on the refinery 100. For example, if the equivalent lost stream days score is greater than the number of down days, there is a larger opportunity for improvement by improving operations to reduce cut-rate barrels than there is in eliminating down days.

Initially at step 382, the operational data is loaded. In some embodiments, the daily output value for each day during the interval is loaded into memory. In addition, the goal value is also loaded into memory.

Next at step 384, the lost opportunity is computed. The output value for each day in the interval is compared to the goal value. For each day in the interval that does not meet the goal value, a difference value between the output on that day and the goal is computed. The lost opportunity is equal to the sum of the differences between production output and the goal value on the days in the interval that did not meet the goal.

Next at step 386, the cut-rate barrels value is computed. The cut-rate barrels value represents a portion of the lost opportunity. The cut-rate barrels value is equal to the sum of the difference between production output and the goal value on the days in the interval that the refinery 100 was operational but did not meet goal.

Next at step 388, an equivalent lost stream days score is calculated. The equivalent lost stream days score is equal to the cut-rate barrels computed in step 386 divided by the daily goal value. In some embodiments, the equivalent lost stream days score is stored in memory. In other embodiments, the equivalent lost stream days score is stored in the operational data.

Next at step 390, the down-day barrels are computed. The down-day barrels value represents a portion of the lost opportunity. The down-day barrels value is equal to the sum of the difference between production output and the goal value on the days in the interval that the refinery 100 was not operational. Because production output is typically zero on days the refinery 100 is not operational, the down-days barrel value is often equal to the product of the daily goal value multiplied by the down days.

Additionally, in some embodiments of process 380, the various scores and values computed are compared to one another.

Figure 9:
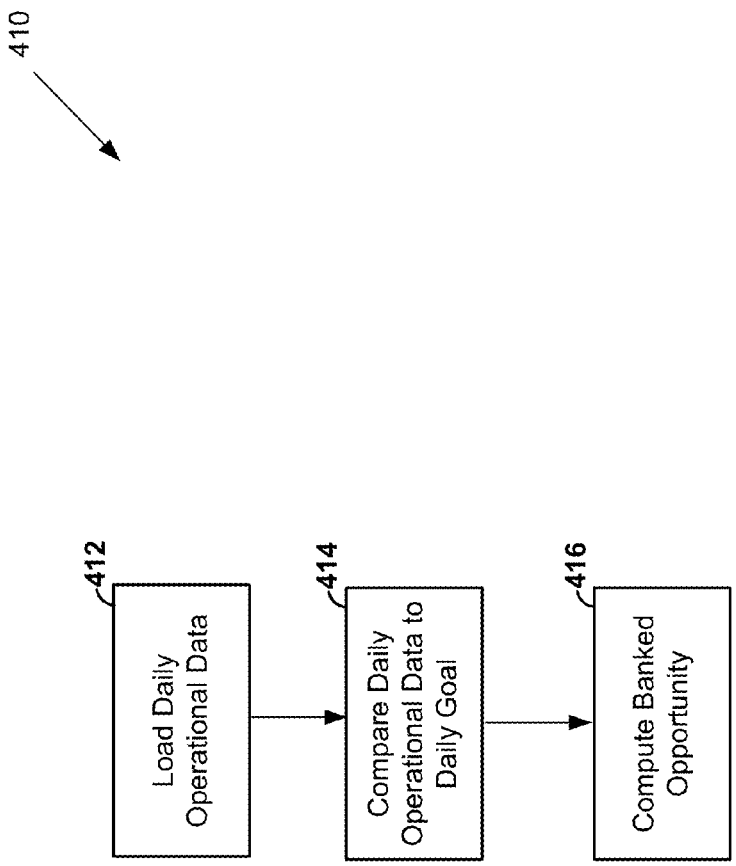
FIG. 9 illustrates an example process performed by some embodiments of the banked opportunity score analysis engine of the refinery evaluation engine of FIG. 1.

FIG. 9 illustrates an example process 410 performed by some embodiments of the banked opportunity analysis engine 260. The process 410 operates to calculate a banked opportunity score for the refinery 100. The banked opportunity score corresponds to the amount of additional production achieved on days where the output of the refinery 100 exceeded the goal value.

Initially at step 412, the operational data is loaded. In some embodiments, the daily output value for each day during the interval is loaded into memory. In addition, the goal value is also loaded into memory.

Next at step 414, the output value for each day in the interval is compared to the goal value to determine whether the output for the day exceeded the goal value.

Next at step 416, for each day in the interval that exceeds the goal value, a difference value is computed between the output on the day and the goal. A sum of the difference values (i.e., the difference between the output on the day and the goal) for each day that exceeded the goal is computed. This sum is the banked opportunity score for the interval. In some embodiments, the banked opportunity score is stored in memory. In other embodiments, the banked opportunity score is stored in the operational data.

Figure 10:
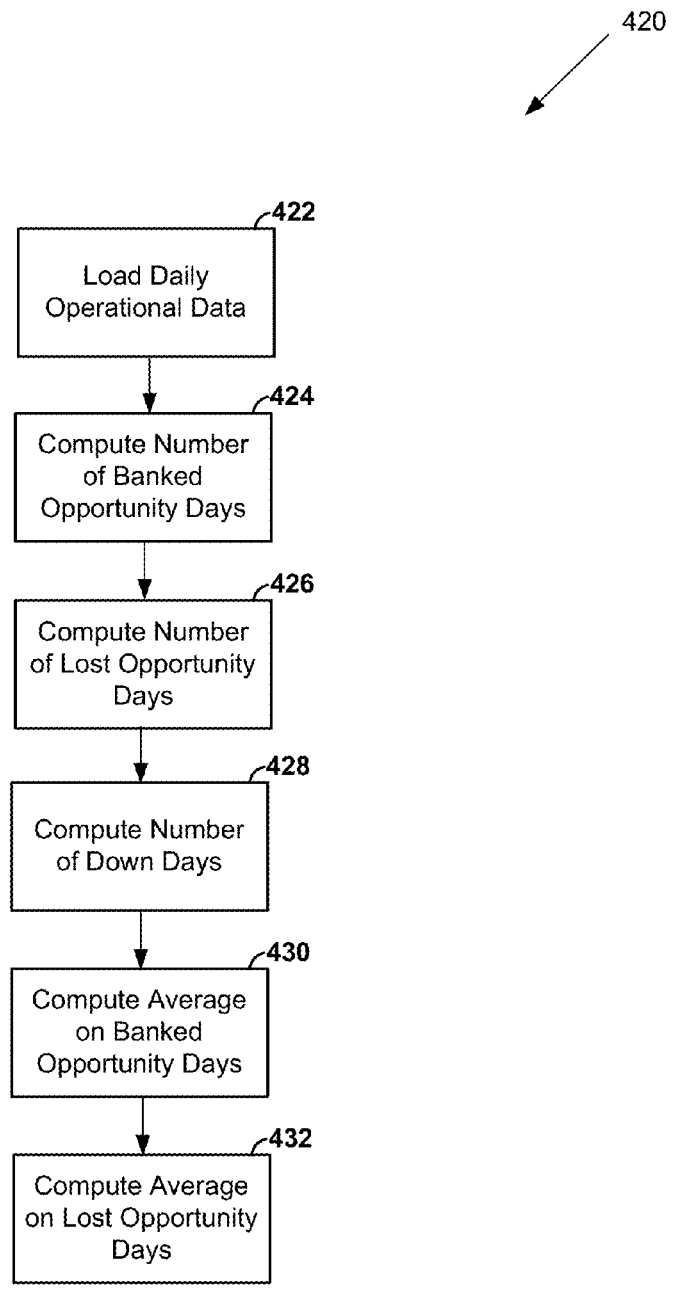
FIG. 10 illustrates an example process performed by some embodiments of the experience factor engine of the refinery evaluation engine of FIG. 1.

FIG. 10 illustrates an example process 420 performed by some embodiments of the experience factor engine 262. The process 420 operates to calculate experience factors for the refinery 100. The experience factors are representative of the experience of the refinery and its personnel. These factors can be considered in the assessing the likelihood that the refinery 100 can repeat performance levels achieved in the past. For example, in some embodiments, experience factors corresponding to the number of days the refinery banked opportunity (i.e., exceeded goal), the number of days the refinery lost opportunity (i.e., did not meet goal), and the number of days the refinery was down are computed. Further, in some embodiments, an average number of barrels processed on banked opportunity days and an average number of barrels processed on lost opportunity days are computed. Additionally, these experience factors may be used in additional computations or presented with values calculated by the other engines (i.e., the banked opportunity and the lost opportunity).

Initially, at step 422, the operation data is loaded. In some embodiments, the daily output value for each day during the interval is loaded into memory. In addition, the goal value is also loaded into memory.

Next, at step 424, the number of banked opportunity days is computed. The output of the refinery 100 during each day in the interval is compared to the daily goal value. Each day that the output of the refinery 100 exceeded the goal is counted to calculate the number of days during the interval that opportunity was banked.

Next, at step 426, the number of lost opportunity days is computed. The output of the refinery 100 during each day in the interval is compared to the daily goal value. Each day that the output of the refinery 100 was below goal is counted to calculate the number of days during the interval that opportunity was lost.

Next, at step 428, the number of down days is computed. The output of the refinery 100 during each day in the interval is evaluated. Each day that the refinery 100 did not produce any output is counted as a down day.

Next, at step 430, the average number of barrels processed on the banked opportunity days is computed. The output of the refinery 100 during each day in the interval is evaluated. The output from each day that the output of the refinery 100 exceeded the goal is averaged to calculate the average number of barrels processed on the banked opportunity days.

Next, at step 432, the average number of barrels processed on the lost opportunity days is computed. The output of the refinery 100 during each day in the interval is evaluated. The output from each day that the output of the refinery 100 was below the goal is averaged to calculate the average number of barrels processed on the lost opportunity days.

The experience factors calculated by process 420 can be considered to illustrate the likelihood of continuing repeating a certain performance level. For example, if opportunity was banked on twenty days over the interval evaluated, it may be likely that the refinery 100 has the experience to repeat this level of performance. Conversely, if opportunity was banked on only one day over the interval evaluated, the refinery 100 may not have the experience to repeat this performance level.

Additionally, in some embodiments, the experience factor engine 262 identifies particular days or sub-intervals during which opportunity was consistently banked. This may lead to discussions with employees of the refinery 100 about how that level of performance was achieve, as well as further evaluation of the current capabilities within the refinery 100. Further, the experience factors can be considered before engaging in an expensive engineering project. The experience factors may provide confidence regarding the current capabilities of the refinery 100.

Figure 11:
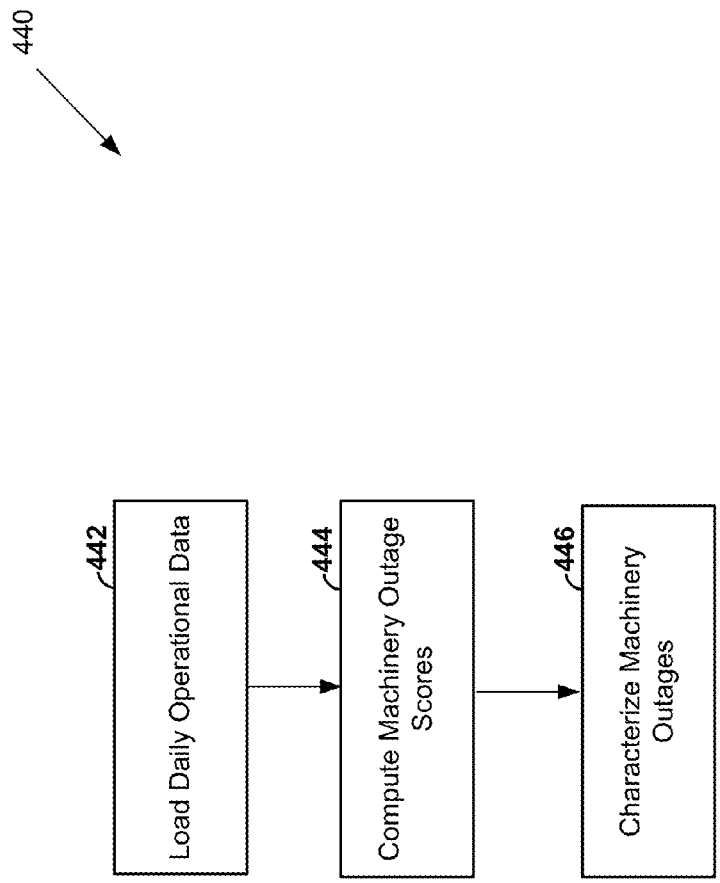
FIG. 11 illustrates a process performed by some embodiments of the equipment outage analysis engine of the refinery evaluation engine of FIG. 1.

FIG. 11 illustrates a process 440 performed by some embodiments of the equipment outage analysis engine. This process 440 operates to calculate a machinery outage score for at least one of the components of the oil processing machinery 108.

Initially at step 442, the operational data is loaded. In some embodiments, the daily output value for each day during the interval is loaded into memory. In addition, the goal value is also loaded into memory. Further, operational data relating to the functional status of a particular component of the oil processing machinery 108 is also loaded into memory. In some embodiments, the functional status of the machine corresponds to whether the machine was operational on a particular day. In other embodiments, the functional status may also indicate that a particular machine did not operate at full capacity or full speed on a particular day.

Next at step 444, the machinery outage scores are computed for at least one component of the oil processing machinery 108. The machinery outage score corresponds to the consequences to the refinery 100 of an outage of a particular component of the oil processing machinery. In some embodiments, the operational data may identify one or more component of the oil processing machinery 108 that limited or constrained production during a particular reporting time period (e.g., a day or shift). In these embodiments, if the output is below goal on a particular day, the difference from the goal is attributed to the identified component of the oil processing machinery 108. In some of these embodiments, the machinery outage score for a particular component of the oil processing machinery 108 is the sum of the difference from the goal value on the days that output did not reach the goal divided by the total number of days where that component was identified as constraining production.

Next at step 446, the machinery outages are characterized. In some embodiments, the machinery outages are characterized by illustrating the frequency and consequences of an outage (e.g., the lost opportunity attributed to the outage). Further, in some embodiments, the machinery outages are also characterized by illustrating how recently the outage occurred. In some embodiments, the machinery outages are characterized in a report. An example report is illustrated and described in greater detail in FIG. 12.

In some embodiments, the machinery outage scores are stored in memory. In other embodiments, the machinery outage scores are stored in the operational data.

Figure 12:
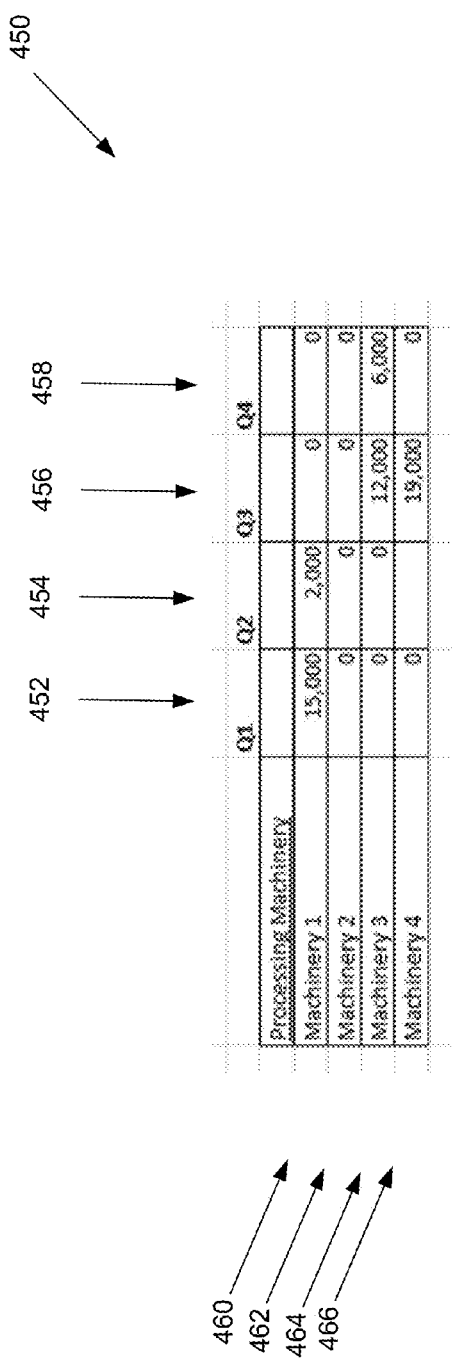
FIG. 12 illustrates an example report generated by the equipment outage analysis engine of FIG. 11.

FIG. 12 illustrates an example machinery outage report 450 generated by the machinery outage analysis engine 264. The example machinery outage report 450 lists the lost opportunity attributed to various components of machinery. The example machinery outage report 450 also shows historical information about lost opportunity attributed to the various components of machinery.

In the report 450, a first column 452 shows the lost opportunity attributable to particular components of machinery during the first quarter (Q1). Likewise, the report 450 also includes columns 454, 456, and 458, which show the lost opportunity attributable to a particular component of the machinery during the second quarter (Q2), third quarter (Q3), and fourth quarter (Q4), respectively. In some embodiments of report 450, more, fewer, or different columns are included. Additionally, in some embodiments, the columns represent different time intervals, such as shifts, days, weeks, months, etc. The example report 450 includes rows 460, 462, 464, and 466 for various example components of machinery. In some embodiments, the report 450 includes all components of the machinery in the continuous process plant. In other embodiments, the report 450 includes only a subset of the machinery in the continuous process plant.

Figure 13:
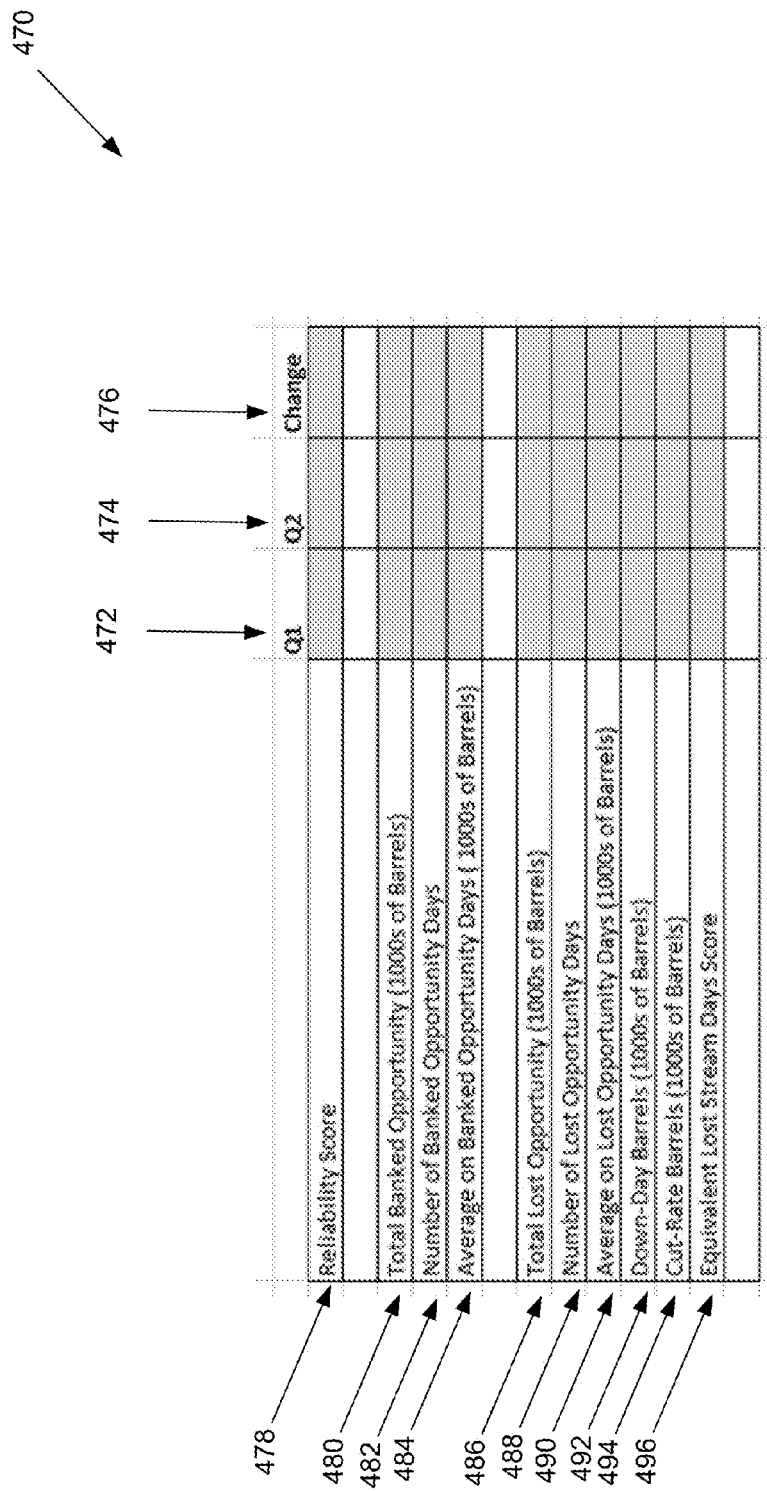
FIG. 13 illustrates an example historical comparison report generated by the historical comparison engine of the refinery evaluation engine of FIG. 1.
Figure 2:
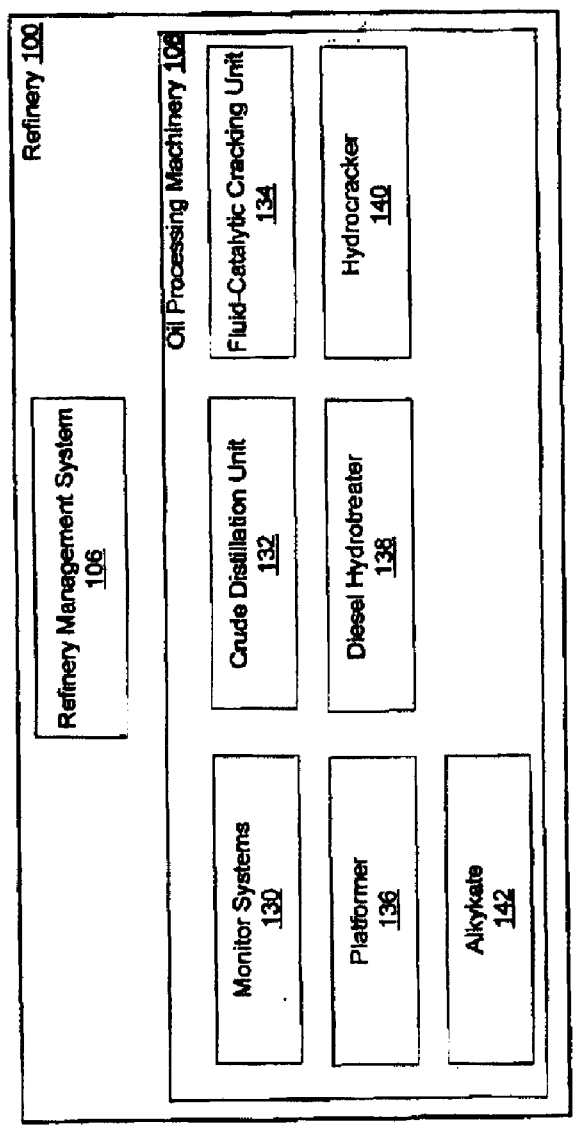

FIG. 13 illustrates an example historical comparison report 470 generated by the historical comparison engine 266. The historical comparison report 470 compares operational data during one or more intervals to operation data from one or more historical intervals.

In the report 470, a first column 472 shows scores for a first interval (Q1), a second column 474 shows scores values for a second interval (Q2), and a third column 476 shows the difference between the scores for the first interval and the second interval. The example report 470 includes a row for the reliability score 478, the total banked opportunity 480, the number of banked opportunity days 482, the average on banked opportunity days 484, the total lost opportunity 486, the number of lost opportunity days 488, the average on lost opportunity days 490, the down-day barrels 492, the cut-rate barrels 494, and the equivalent lost stream days score 496. In some embodiments, there are additional, different, or fewer rows in the report. In some embodiments, additional intervals are included on the historical comparison report. Additionally, in some embodiments, the historical comparison report is illustrated with graphs and charts. Further, in some other embodiments, other reporting and illustrating techniques are used to compare scores from intervals.

Although many of the embodiments described above refer to a refinery, it should be understood that the present disclosure encompasses methods and systems applicable to all forms of continuous process plants, including petrochemical plants and fertilizer plants. Similarly, although the embodiments of the present disclosure refer to oil processing machinery or equipment, the present disclosure encompasses other machinery and equipment in continuous process plants as well. Additionally, although many of the embodiments described above refer to various daily measurements, goals, scores, or values, the present disclosure encompasses other time intervals for those measurements, goals, scores, or values as well (e.g., hours, shifts, weeks, etc.).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of evaluating operation of a continuous process plant, comprising:
   loading operational data for a continuous process plant, wherein the operational data comprises a plurality of data points, each of the data points in the plurality of data points representing a time period and a quantity processed during that time period;
   identifying a goal value;
   processing the operational data to identify cut-rate data points, the cut-rate data points representing time periods with a quantity processed that is less than the goal value;
   calculating a cut-rate lost opportunity, wherein the cut-rate lost opportunity corresponds to the sum of the difference between the goal value and the quantity processed for each of the cut-rate data points;
   calculating, by a computing device, a score for the continuous process plant, wherein the score corresponds to the quotient of the cut-rate lost opportunity divided by the goal value;
   processing the operational data to identify banked-opportunity data points, the banked-opportunity data points representing time periods with a quantity processed that is greater than the goal value; and
   calculating a banked opportunity, wherein the banked opportunity corresponds to the sum of the difference between the quantity processed and the goal value for each of the banked-opportunity data points.

2. The method of claim 1, further comprising:
   determining a reliability score, wherein the reliability score corresponds to a percent of the data points in the plurality of data points having a quantity processed that is equal to or greater than the goal value.

3. The method of claim 1, further comprising:
   determining a first count value, wherein the first count value corresponds to a number of data points in the plurality of data points having a quantity processed that is equal to or greater than the goal value;
   determining a second count value, wherein the second count value corresponds to a number of data points in the plurality of data points having a quantity processed that is less than the goal value.

4. The method of claim 3, further comprising:
   displaying, on a display device, the score for the processing plant, the banked opportunity, the first count value, and the second count value.

5. The method of claim 1, further comprising:
   loading historical operational data for a continuous process plant, wherein the historical operational data comprises a plurality of historical data points; and
   comparing the operational data to the historical operational data.

6. The method of claim 1, wherein the continuous process plant is a refinery.

7. The method of claim 1, wherein the continuous process plant is a petrochemical plant.

8. The method of claim 1, wherein the continuous process plant is a fertilizer plant.

9. The method of claim 1, wherein each of the data points in the plurality of data points represent a time period with a duration of one day.

10. The method of claim 1, wherein each of the data points in the plurality of data points represent a time period with a duration of one shift.

11. The method of claim 1, wherein the goal value is identified by receiving a user input.

12. The method of claim 1, wherein the goal value is identified based on historical data.

13. The method of claim 1, further comprising:
    loading equipment operational data, wherein the equipment operational data identifies a component of the continuous process plant that limited the quantity processed in at least one of the data points; and
    classifying equipment in the continuous process plant using the operational data and the equipment operational data.

14. A continuous process plant comprising:
    processing machinery, the processing machinery being configured to process at least one substance; and
    a computing device, the computing device comprising:
      a processing unit; and
      a set of computer-readable data storage media comprising at least one computer-readable data storage medium, the set of computer-readable data storage media storing software instructions that, when executed by the processing unit, cause the computing device to:
        load operational data for a continuous process plant, wherein the operational data comprises a plurality of data points, each of the data points in the plurality of data points representing a time period and a quantity processed during that time period;
        identify a goal value;
        process the operational data to identify cut-rate data points, the cut-rate data points representing time periods with a quantity processed that is less than the goal value;
        calculate a cut-rate lost opportunity, wherein the cut-rate lost opportunity corresponds to the sum of the difference between the goal value and the quantity processed for each of the cut-rate data points;
        calculate a score for the continuous process plant, wherein the score corresponds to the quotient of the cut-rate lost opportunity divided by the goal value;
        process the operational data to identify banked-opportunity data points, the banked-opportunity data points representing time periods with a quantity processed that is greater than the goal value; and
        calculate a banked opportunity, wherein the banked opportunity corresponds to the sum of the difference between the quantity processed and the goal value for each of the banked-opportunity data points.

15. The plant of claim 14, wherein the software instructions further cause the computing device to:
    determine a reliability score, wherein the reliability score corresponds to a percent of the data points in the plurality of data points having a quantity processed that is equal to or greater than the goal value.

16. The plant of claim 14, wherein the software instructions further cause the computing device to:
    determine a first count value, wherein the first count value corresponds to a number of data points in the plurality of data points having a quantity processed that is equal to or greater than the goal value; and determine a second count value, wherein the second count value corresponds to a number of data points in the plurality of data points having a quantity processed that is less than the goal value.

17. The plant of claim 16, wherein the software instructions further cause the computing device to:
   display the score for the processing plant, the banked opportunity, the first count value, and the second count value.

18. A method of evaluating operation of a continuous process plant, comprising:
   loading operational data for a continuous process plant, wherein the operational data comprises a plurality of data points, each of the data points in the plurality of data points representing a time period and a quantity processed during that time period;
   identifying a goal value;
   processing the operational data to identify cut-rate data points, the cut-rate data points representing time periods with a quantity processed that is less than the goal value;
   calculating a cut-rate lost opportunity, wherein the cut-rate lost opportunity corresponds to the sum of the difference between the goal value and the quantity processed for each of the cut-rate data points;
   calculating, by a computing device, a score for the continuous process plant, wherein the score corresponds to the quotient of the cut-rate lost opportunity divided by the goal value;
   processing the operational data to identify banked-opportunity data points, the banked-opportunity data points representing time periods with a quantity processed that is greater than the goal value;
   calculating a banked opportunity, wherein the banked opportunity corresponds to the sum of the difference between the quantity processed and the goal value for each of the banked-opportunity data points;
   determining a reliability score, wherein the reliability score corresponds to the percent of the data points in the plurality of data points having a quantity processed that is equal to or greater than the goal value;
   determining a first count value, wherein the first count value corresponds to a number of data points in the plurality of data points having a quantity processed that is equal to or greater than the goal value;
   determining a second count value, wherein the second count value corresponds to a number of data points in the plurality of data points having a quantity processed that is less than the goal value;
   loading historical operational data for a continuous process plant, wherein the historical operational data comprises a plurality of historical data points; and
   comparing the operational data to the historical operational data.

* * * * *

UNITED STATES PATENT AND TRADEMARK OFFICE
CERTIFICATE OF CORRECTION

| | | |
|---|---|---|
| PATENT NO. | : 8,855,968 B1 | |
| APPLICATION NO. | : 14/101832 | |
| DATED | : October 7, 2014 | |
| INVENTOR(S) | : Gillis | |

It is certified that error appears in the above-identified patent and that said Letters Patent is hereby corrected as shown below:

In the Drawings:

Sheet 2 of 13: Delete incorrect FIG. 2 and replace with new FIG. 2 as shown on attached sheet.

In the Specification:

Col. 7, line 18: "device 102 through in other" should read --device 102 through other--

Col. 10, line 41: "In other embodiments, other methods of" should read --Other embodiments, include other methods of--

Col. 13, line 23: "was achieve, as well as" should read --was achieved, as well as--

Col. 13, line 30: "embodiments of the equipment outage analysis engine." should read --embodiments of the machinery outage analysis engine 264.--

Col. 13, lines 50-51: "one or more component of the oil" should read --one or more components of the oil--

Signed and Sealed this
Twelfth Day of May, 2015

Michelle K. Lee
*Director of the United States Patent and Trademark Office*